United States Patent Office.

SAMUEL LEWIS SUMMERS, OF PHILADELPHIA, PENNSYLVANIA.

METALLIC SALTS OF METHYLENE DISALICYLIC ACID AND PROCESS OF MAKING SAME.

SPECIFICATION forming part of Letters Patent No. 716,593, dated December 23, 1902.

Application filed June 16, 1902. Serial No. 111,935. (No specimens.)

*To all whom it may concern:*

Be it known that I, SAMUEL LEWIS SUMMERS, a citizen of the United States, residing in the city of Philadelphia, State of Pennsylvania, have invented and discovered certain new and useful Metallic Salts of Methylene Disalicylic Acid and Process of Producing the Same, of which the following is a full, clear, and exact description.

My invention relates to a new chemical compound having especial utility as a pharmaceutical product by reason of its therapeutic value, particularly as an internally-administered antiseptic in gastro-intestinal diseases, wherein doses of from two to five grains produce marked beneficial results, and I believe it will be found useful in other cases as the result of further clinical tests.

The new body is generically a metallic salt of methylene disalicylic acid, in which the base is of the class known as "heavy" metals.

In a former application for Letters Patent filed by me April 24, 1902, Serial No. 104,821, I have described and claimed an acid body—namely, methylene disalicylic acid—which will be found fully described in the specification attached to said application and which therefore need not be further described herein, save to say that it is a crystalline body composed of two salicylic-acid molecules deprived of one hydrogen atom in each salicylic-acid group and chemically united or held together by the methylene group. In another application bearing even date herewith I have described and claimed the product and process of making the alkali salts of this body and which being fully described therein need not be here repeated, save to say generally that it consists in taking a soluble compound of one of the alkalies—such as sodium, ammonium, lithium, and potassium—and allowing it to react on methylene disalicylic acid. I produce an alkali salt thereof, which may be described as having the formula $C_{15}H_{10}O_6(R')_2$, in which $R'$ represents the alkali metal.

My present invention consists in taking the last-named body as a starting material and allowing a soluble salt of one of the heavy metals, as hereinafter stated, to react thereon in the manner and proportions described. I produce another new body having valuable medicinal properties—namely, methylene disalicylic acid—in and with which the heavy metal of the salt employed in the reaction is chemically united. For example, desiring to produce the bismuth salt from the sodium methylene disalicylate referred to I take three hundred and thirty-two parts of the latter dissolved in five thousand parts of water and add thereto a fifty-per-cent.-acetic-acid solution of two hundred and eighty parts of pure bismuth nitrate, whereupon a precipitate is formed, which is to be washed free from soluble salts, giving a powder which is white and having the formula $(C_{15}H_{10}O_2(CO_2)_2)_3Bi_2$, insoluble in alcohol and ether. An analogous reaction takes place if an aqueous solution of one hundred and twelve parts of ferric chlorid, or one hundred and twenty parts of pure aluminium sulfate, or two hundred and ninety-five parts of pure crystallized zinc sulfate, or one hundred and ninety parts of pure cadmium chlorid, or one hundred and ninety-five parts of pure copper nitrate are substituted for the acetic-acid solution of bismuth nitrate, the resulting specific metallic salt of the body acted on in each case being produced by the same general reaction and having the same general characteristics, differing, of course, somewhat in color of the end product, the greater or less insolubility in ether and alcohol, and the specific metal, but all of the species being insoluble in water either hot or cold.

Having thus described my invention, what I claim as new, and desire to secure by Letters Patent, is—

1. The new product described, which is a metallic salt of methylene disalicylic acid, wherein a heavy metal is chemically united with the acid residue of methylene disalicylic acid; an impalpable powder, having a color governed by the specific metallic salt employed; more or less insoluble in ether and alcohol; insoluble in water, either hot or cold; and having the chemical constitution hereinabove recited.

2. The process described, of producing the metallic salts of methylene disalicylic acid, which consists in allowing a solution of the salts of a heavy metal to react on an alkali salt of methylene disalicylic acid in aqueous solution, and isolating the resultant precipitate.

In testimony whereof I have hereunto affixed my signature this 9th day of June, A. D. 1902.

SAMUEL LEWIS SUMMERS.

Witnesses:
WAYNE P. RAMBO,
PHINEAS RAMBO.